O. W. Hogle.
Revolving Rake.
N° 7618   Patented Sep. 3, 1850.
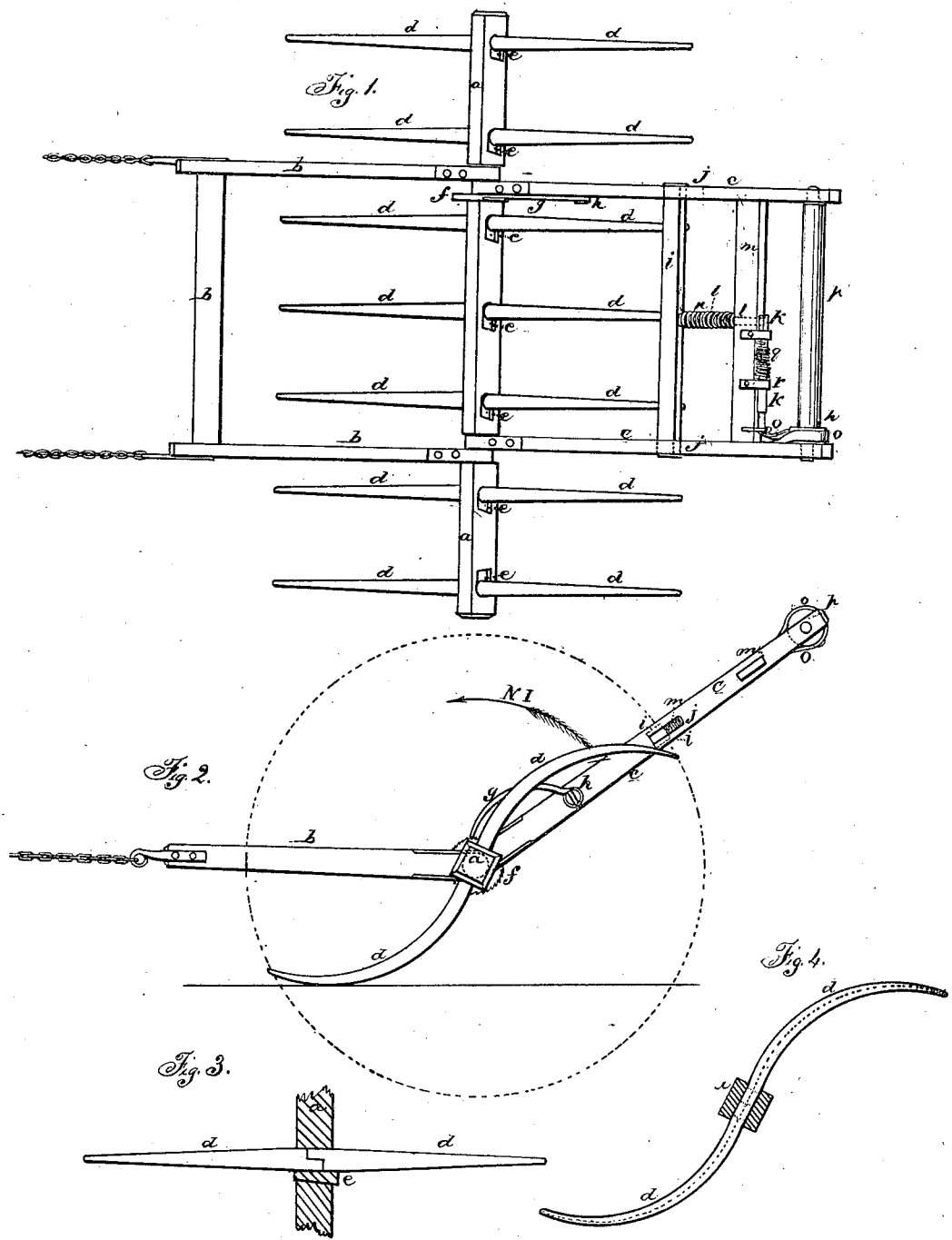

UNITED STATES PATENT OFFICE.

O. W. HOGLE, OF SOMERSET, NEW YORK.

IMPROVEMENT IN FASTENINGS OF HAY-RAKES.

Specification forming part of Letters Patent No. 7,618, dated September 3, 1850.

*To all whom it may concern:*

Be it known that I, ORANGE W. HOGLE, of the town of Somerset, in the county of Niagara and State of New York, have invented new and useful Improvements in the construction of Revolving Horse Hay-Rakes, which are described as follows, reference being had to the annexed drawings of the same, making part of this specification.

My improvements relate particularly to the manner of constructing the wooden cyma-reversa teeth of the rake and the manner of holding them during the operation of raking, and the manner of revolving them while discharging the hay into a windrow, the formation and arrangement of said teeth and other parts of the machine being such as to render the rake the lightest, cheapest, and most symmetrical rake of all the revolving horse hay-rakes in use.

Figure 1 is a bird's-eye view of the rake. Fig. 2 is a side elevation of the same as in operation. Fig. 3 is a section of one of the teeth and a portion of the revolving shaft. Fig. 4 is a side view of one of the teeth.

Similar letters in the several figures refer to corresponding parts.

The shaft $a$, draft-frame $b$, to which the horse is attached for drawing the rake, and guiding-frame $c$, by which the operator guides and manages the rake, are generally made and arranged in the manner represented in Figs. 1 and 2.

My improved teeth are made in the following manner: I take a piece of wood suitable for the purpose, and having brought it to the required size I steam the same and bend it into the form of a semicircle and then dry it. When dried I cut it into two parts, each embracing a segment of a circle of ninety degrees. Each of these segments is then tapered neatly and rounded at the point, and notched at the larger end for ship-lapping. This will form two teeth, $d$. I then take these two teeth and insert them into an oblong opening in the shaft $a$ and ship-lap their two large ends and secure them by a wedge, $e$, as seen in Fig. 3, the two teeth $d$ thus placed and secured forming a cyma-reversa figure, as represented in the drawings at Figs. 2 and 4. The teeth of the rake being all formed and secured in the same simple manner, whenever it becomes necessary to renew a tooth the farmer need not send his machine to a shop, as he can easily make and insert a tooth himself. The manner of holding the teeth in the required position during the operation of raking the hay and of revolving them in order to deposit the hay in windrows is equally simple.

On the shaft $a$, next the inner side of one of the arms $c$ of the guiding-frame, I secure a ratchet-wheel, $f$, and to the side of the arm next the wheel I attach a pawl, $g$, by a joint-pin, $h$, which engages with the said ratchet-wheel $f$. Between the arms $cc$, I place a transverse sliding holding-bar, $i$, against which the convex sides or bow-surfaces of several of the teeth rest during the operation of raking, the ends of said bar $i$ being provided with tenons which slide in oblong grooves or mortises $j$ in the arms. The ratchet-wheel and pawl are designed for holding the teeth or fingers firmly against the bar $i$ by preventing the shaft turning toward the bar. When it is required to turn the shaft from the bar, or in the direction of the arrow No. 1, in order to discharge the hay from the teeth, the aforesaid sliding rest-bar $i$ must be moved from the shaft toward the operator, so as to allow the ends of the teeth resting against it to pass by the same while the shaft revolves a portion of a circle. As soon as these teeth have passed the bar it (the bar) returns to its former position, to be in readiness to arrest the motion of the opposite set of teeth, which are held in like manner by the combined action of this bar and the ratchet-wheel and pawl. The bar is allowed to move toward the operator at the required time to revolve and empty the rake by drawing a slide-bolt, $k$, from behind the end of a stem, $l$, projecting back from the middle of the transverse sliding bar $i$, and passing through an opening in a fixed transverse bar, $m$, lying parallel to the said sliding bar, the movement of the latter being caused by the pressure of the convex surfaces of the teeth against it as they are revolved by the forward movement or draft of the shaft, and the resistance caused by the hay resting against the teeth below the shaft, at the same time contracting a helical spring, $n$, coiled around the stem $l$, and having one of its ends resting against the sliding bar $i$ and the other end against the fixed bar $m$. The teeth having passed the bar, it is returned to its former position by the action of the said helical spring $n$.

Upon the cross-bar $m$ is arranged a reciprocating slide, $k$, actuated by a coiled spring, $p$, and a flexible strap, $o$, attached to the slide $k$ and to a hand-roller, *p*. The end of this slide *k* next the center of the machine is made to cap over or cover the upper end of the stem *l* of the sliding bar *i* by the action of the spring, thus holding the rake firmly. A very slight movement of the roller on its axis, effected by the hand of the operator, draws back the slide and allows the transverse slide-bar to rise or recede from the teeth by the pressure of the convex or curved portions of the teeth against said transverse sliding bar, permitting the rake-teeth to revolve and discharge the hay behind the axle and to be adjusted for the next load. Should the windrow not be high enough to bring the convex surfaces of the teeth against the stop-bar *i*, bear down the bar *i* by bearing upon the hand-roller *p*. At the same time the pawl will slip over the teeth of the ratchet-wheel and lay hold of one of them, and thus confine the rake-teeth against the bar. Then raise the roller and bring the rake-teeth to the required position for raking the hay most advantageously, which is effected in a moment by merely raising the roller. This hand-roller performs several important offices besides that of drawing back the slide and adjusting and securing the teeth. It serves to manage and guide the machine in any required direction; to raise or lower the points of the front teeth in order to avoid obstructions; to throw the points of the teeth into hollows to rake out the hay; to lift the rake by holding back the shaft while the horse pulls forward, and by which to suspend the machine when not in use. The teeth being made of elastic hickory or ash or other suitable wood, in the form of a quarter of a circle, and inserted into the shaft in the manner described, permits them to slide over the ground on the bow portions of the teeth, in the manner of a sleigh-runner, and gather the hay in the most effectual and easy manner without the usual injurious effect produced by causing the points of the teeth to scrape the ground, as in the use of the wire teeth, and the machine being so very light and elastic that it can be made to rise from the ground and pass over knolls, stones, stumps, and other obstructions by the operation of simply holding back the machine by the roller while the horse is made to move forward, or by the raising or lowering of the handle to any required pitch.

The teeth of this machine are made to assume nearly the same position of the teeth of the common hand-rake, and will rake nearly or quite as clean, and imposes no more labor upon the man or boy who guides it than simply to follow it with his hand upon the roller, from which it is not removed while at work. It will at once be discovered that this revolving rake is drawn on the bow or curve of the teeth, causing the shaft to be lifted from the ground at least twelve inches, thus doing away with the friction caused by drawing the shaft upon the ground, and the injurious effect arising from its tearing up the young clover thrown up by the frosts of the winter; and, likewise, it does not cover the hay with dust and dirt, as is experienced by the use of the rakes whose teeth have their points scraping over the ground, or whose beam drags upon the ground.

The cyma-reversa teeth may be made in one piece instead of two pieces, as before described; but I prefer making each tooth in two pieces and ship-lapping them in the manner herein set forth, as it can be replaced at less cost.

This rake will fold, and can be hung up in any convenient place in the barn.

Having thus described the construction and operation of my improved revolving horse hay-rake, what I claim, and desire to secure by Letters Patent, is—

1. The manner of holding the teeth *d* firmly in their required positions against the sliding bar *i* during the operation of the machine by means of the aforesaid combination of the ratchet-wheel *f*, pawl *g*, sliding bar *i*, and stem *l*, helical spring *n*, fixed bar *m*, and slide *k*, attached thereto, with the parallel guiding-arms *c* and revolving finger-shaft *a*, arranged and operating in the manner and for the purpose above set forth.

2. The combination of the slide *k*, helical spring *q*, strap *o*, and roller *p*, with the parallel arms *c*, and fixed bar *m*, for disengaging the sliding stop-bar *i* from the rake-teeth *d* without moving the hand from its usual position on the hand-roller *p* to allow the teeth to revolve to deposit the hay in windrows, as herein fully set forth.

In testimony whereof I have hereunto signed my name before two subscribing witnesses.

ORANGE W. HOGLE.

Witnesses:
WM. P. ELLIOT,
WM. DOUGLASS.